(12) United States Patent
Hopping (10) Patent No.: US 10,569,274 B2
(45) Date of Patent: Feb. 25, 2020

(54) LOCKING BOLT ASSEMBLY FOR A CRUSHER DEVICE

(71) Applicant: FLSmidth A/S, Valby (DK)

(72) Inventor: Philip Hopping, Pekin, IL (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 16/095,220

(22) PCT Filed: May 9, 2017

(86) PCT No.: PCT/IB2017/052691
§ 371 (c)(1),
(2) Date: Oct. 19, 2018

(87) PCT Pub. No.: WO2017/195104
PCT Pub. Date: Nov. 16, 2017

(65) Prior Publication Data
US 2019/0134640 A1    May 9, 2019

(30) Foreign Application Priority Data

May 10, 2016  (DK) .................................. 2016 70310

(51) Int. Cl.
*B02C 2/00* (2006.01)
*B02C 2/04* (2006.01)
(Continued)

(52) U.S. Cl.
CPC ................ *B02C 2/005* (2013.01); *B02C 2/00* (2013.01); *B02C 2/04* (2013.01); *B23P 19/12* (2013.01);
(Continued)

(58) Field of Classification Search
CPC ... B02C 2/005; B02C 2/04; B02C 2/00; F16B 31/04; B23P 6/00; B23P 19/06;
(Continued)

(56) References Cited

U.S. PATENT DOCUMENTS 3,462,180 A * 8/1969 Bunyan ................... F16D 1/097
403/40
4,245,792 A    1/1981 Ivanov et al.
(Continued)

FOREIGN PATENT DOCUMENTS

EP    2535110 A1    12/2012
SU    829169 A1     5/1981

OTHER PUBLICATIONS

International Search Report and Written Opinion dated Jul. 14, 2017, 9 pages.

*Primary Examiner* — Jermie E Cozart
(74) *Attorney, Agent, or Firm* — Jeffrey A. Sharp (57) ABSTRACT

A locking bolt assembly (1) for securing a mantle (40) to a head assembly (60) of a crushing device includes locking bolt (10) having a head portion (10a) and a thread portion (10b); a re-useable thrust plate (30) disposed between the head portion (10a) and a top surface portion (42) of the mantle (40); one or more fasteners (20) for connecting the locking bolt (10) to the re-useable thrust plate (30); and one or more permanent jacking screws (34) for forcing the locking bolt (10) up and the thrust plate (30) down onto the top surface portion (42) of the mantle (40) so that the mantle (40) is secured on the head assembly (60).

9 Claims, 8 Drawing Sheets

(51) Int. Cl.
*B23P 19/12* (2006.01)
*F16B 31/04* (2006.01)
B23P 19/06 (2006.01)
B23P 6/00 (2006.01)

(52) U.S. Cl.
CPC ................ *F16B 31/04* (2013.01); *B23P 6/00* (2013.01); *B23P 19/06* (2013.01); *B23P 19/067* (2013.01); *Y10T 29/4994* (2015.01)

(58) Field of Classification Search
CPC .. B23P 19/067; B23P 19/12; Y10T 29/49948; Y10T 29/49963
See application file for complete search history.

(56) References Cited

U.S. PATENT DOCUMENTS

| | | | | |
|---|---|---|---|---|
| 5,850,978 | A * | 12/1998 | Jacobson | B02C 2/005 241/215 |
| 6,112,396 | A * | 9/2000 | Steinbock | B23P 19/067 29/452 |
| 8,832,921 | B2 * | 9/2014 | Marks | B02C 2/005 241/207 |

* cited by examiner

LOCKING BOLT ASSEMBLY FOR A CRUSHER DEVICE

FIELD OF THE INVENTION

The present invention relates to crushing equipment, and more particularly to a locking bolt assembly for use with a crushing device that facilitates easier and safer installation and/or replacement of a mantle on a head assembly of the crushing device.

BACKGROUND OF THE INVENTION

Crushing devices, such as cone crushers, are typically used to crush rock, ore or minerals. Crushers may form a circuit of a process configured to crush material from a first size to a smaller size. After the material is crushed, the material may be moved to a grinding circuit for grinding the material to an even smaller size. Examples of crusher devices may be appreciated from e.g. U.S. Pat. Nos. 1,537,564, 4,192,472, 4,391,414, 4,478,373, 4,756,484, 4,844,362, 4,892,257, 4,895,311, 5,312,053, 5,372,318, 5,779,166, 5,810,269, 5,996,916, 6,000,648, 6,036,129, 6,213,418, 6,446,977, 6,648,255, 7,048,214 and U.S. Patent Application Publication Nos. 2003/0183706, 2005/0269436, 2006/0144979, 2008/0115978, and 2008/0272218.

Cone crushers generally include an eccentric assembly that rotates about a main shaft and imparts gyratory motion to a crusher head assembly. Material to be crushed is loaded into a feed hopper that feeds into a bowl assembly. The material, generally rock, is crushed between a bowl liner disposed on the bowl assembly and a mantle disposed on the crusher head assembly. During the use of a cone crusher, because of wear the mantle is required to be removed and replaced with a new mantle from time to time.

Typically, in cone crushers in which the mantle is secured to the head assembly via a locking bolt, a consumable torch ring is first placed on the mantle, and the locking bolt is threaded into a bore in the head assembly. Once the locking bolt is securely threaded into the bore in the head assembly, large and heavy pendulum rams or sledge hammers are used to strike a large wrench that is bolted onto the top of the locking bolt in order to tighten the locking bolt and secure the mantle onto the head assembly. The large amount of turning effort that is needed to tighten down the locking bolt often requires several maintenance personnel which increase maintenance costs and time. Additionally, the use of such heavy tools subjects the threads of the locking bolt to undetermined amount of force which can mechanically weaken the locking bolt or strip the threads. When a torch ring is used, in order to replace the mantle, an oxygen/acetylene torch is required in order to cut off the torch ring. This practice is unsafe and unnecessary. Additionally, the torch ring is a consumable product which increases customer costs.

OBJECT OF THE INVENTION

It is an object of the invention to overcome or at least alleviate one or more of the above problems and/or provide the consumer with a useful or commercial choice.

SUMMARY OF THE INVENTION

A locking bolt assembly for securing a mantle to a head assembly of a crushing device is provided. The locking bolt assembly may comprise: a locking bolt comprising a head portion and a thread portion, the head portion having one or more axial bores there through; a re-useable thrust plate disposed between the head portion and a top surface portion of the mantle, the re-useable thrust plate having one or more axial bores there through; one or more fasteners disposed in and at least partially through the axial bores for connecting the locking bolt to the re-useable thrust plate; and one or more permanent jacking screws disposed in and at least partially through the axial bores for forcing the locking bolt up and the thrust plate down onto the top surface portion of the mantle so that the mantle is secured on the head assembly.

In an exemplary embodiment of the locking bolt assembly, the locking bolt assembly may further comprise a gasket disposed between the head portion and the re-useable thrust plate. In an exemplary embodiment of the locking bolt assembly, the locking bolt assembly may further comprise a protective sleeve for protecting an outer annular surface of the locking bolt wherein the protective sleeve is disposed around an outer annular surface of the head portion. In an exemplary embodiment of the locking bolt assembly, the locking bolt assembly may further comprise a feed plate. In an exemplary embodiment of the locking bolt assembly, the locking bolt assembly may further comprise nuts disposed in one or more of the axial bores for accepting the permanent jacking screws.

A method for securing a mantle to a head assembly of a crushing device is also provided. The method comprises: providing a locking bolt assembly comprising a locking bolt having a head portion with one or more axial bores there through and a thread portion, and a re-useable thrust plate having one or more axial bores there through, the re-useable thrust plate being connected to the head portion via one or more fasteners disposed in and at least partially through the axial bores; positioning the mantle on the head assembly; attaching the locking bolt assembly to the head assembly; inserting a plurality of permanent jacking screws into and at least partially through the axial bores of the head portion; moving the plurality of permanent jacking screws within the axial bores such that the permanent jacking screws create a locking force between the locking bolt assembly and the head assembly and the locking bolt is pushed up and the re-useable thrust plate is pushed down onto a top surface portion of the mantle such that the mantle is secured on the head assembly. In an exemplary embodiment of the method, the thrust plate is positioned on the top surface portion of the mantle. In an exemplary embodiment of the method, each of the axial bores can include a series of internal threads that engage external threads on the permanent jacking screws, wherein the permanent jacking screws are each rotated to move the permanent jacking screws to create the locking force between the locking bolt assembly and the head assembly.

In an exemplary embodiment of the method, the method may further comprise the step of inserting nuts into one or more of the axial bores, wherein each of the nuts can include a series of internal threads that engage external threads on the permanent jacking screws, wherein the permanent jacking screws are each rotated to move the permanent jacking screws to create the locking force between the locking bolt assembly and the head assembly.

Other details, objects, and advantages of the invention will become apparent as the following description of certain present exemplary embodiments thereof and certain present exemplary methods of practicing the same proceeds.

BRIEF DESCRIPTION OF THE FIGURES

Embodiments of the invention, by way of example only, will be described with reference to the accompanying drawings in which.

DETAILED DESCRIPTION OF THE INVENTION

Figure 1:
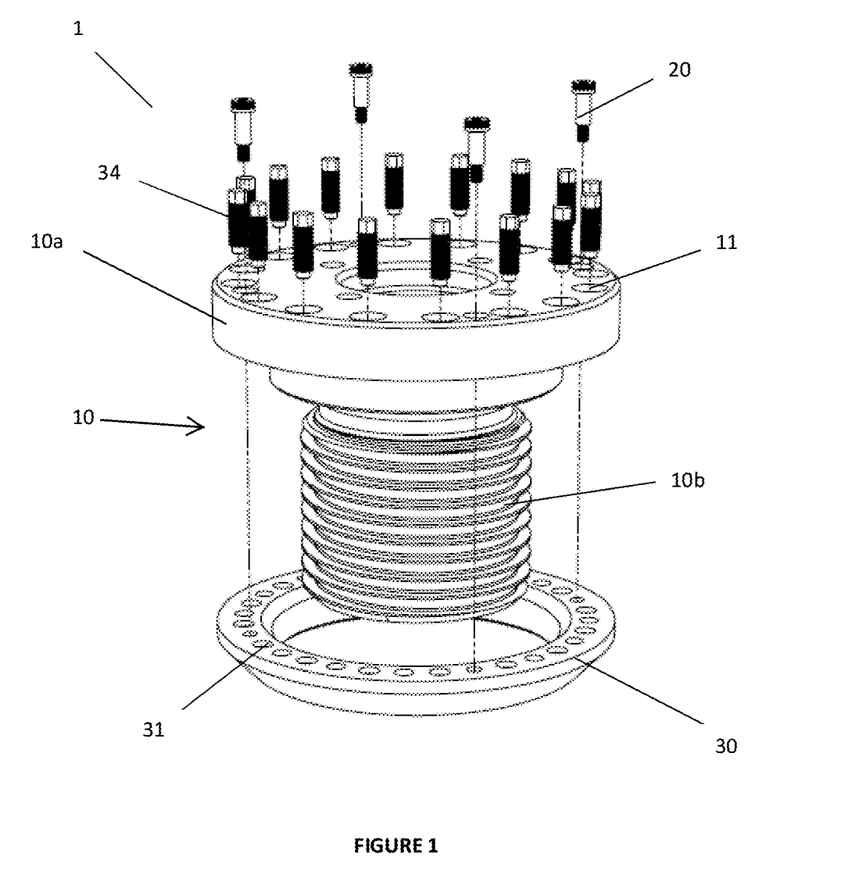
FIG. 1 shows an overview of an exemplary embodiment of the locking bolt assembly.
Figure 2:
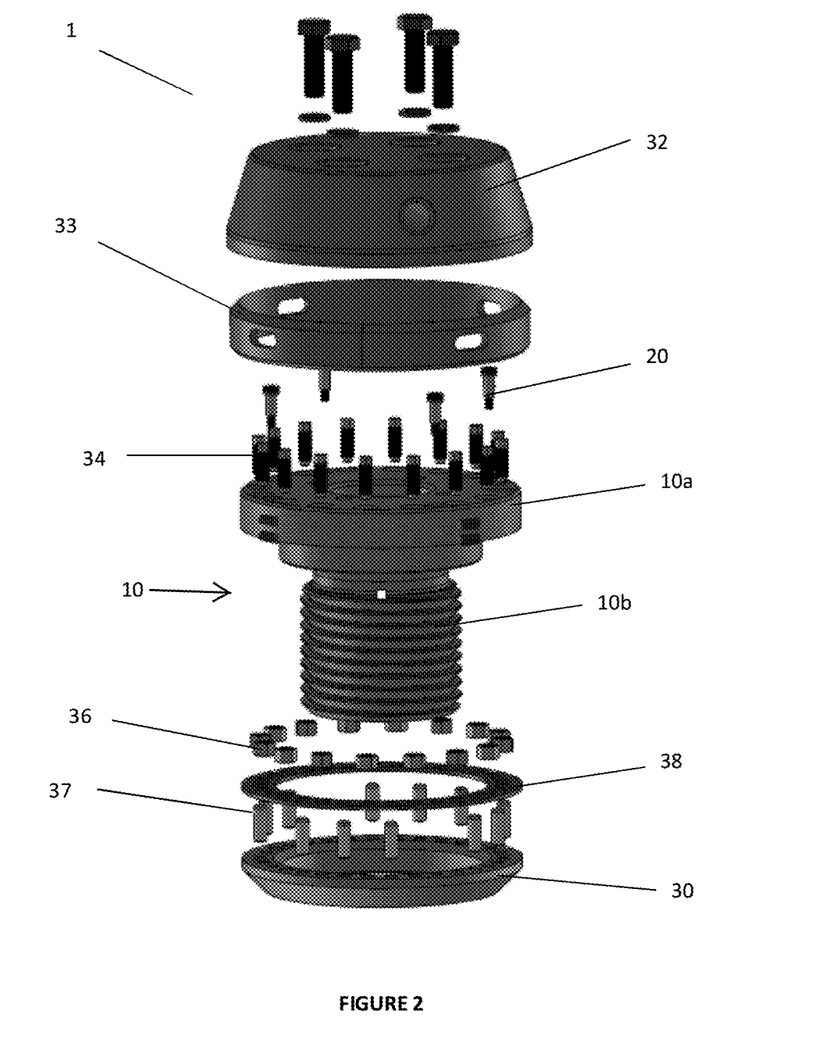
FIG. 2 shows an overview of a more detailed exemplary embodiment of the locking bolt assembly.
Figure 3:
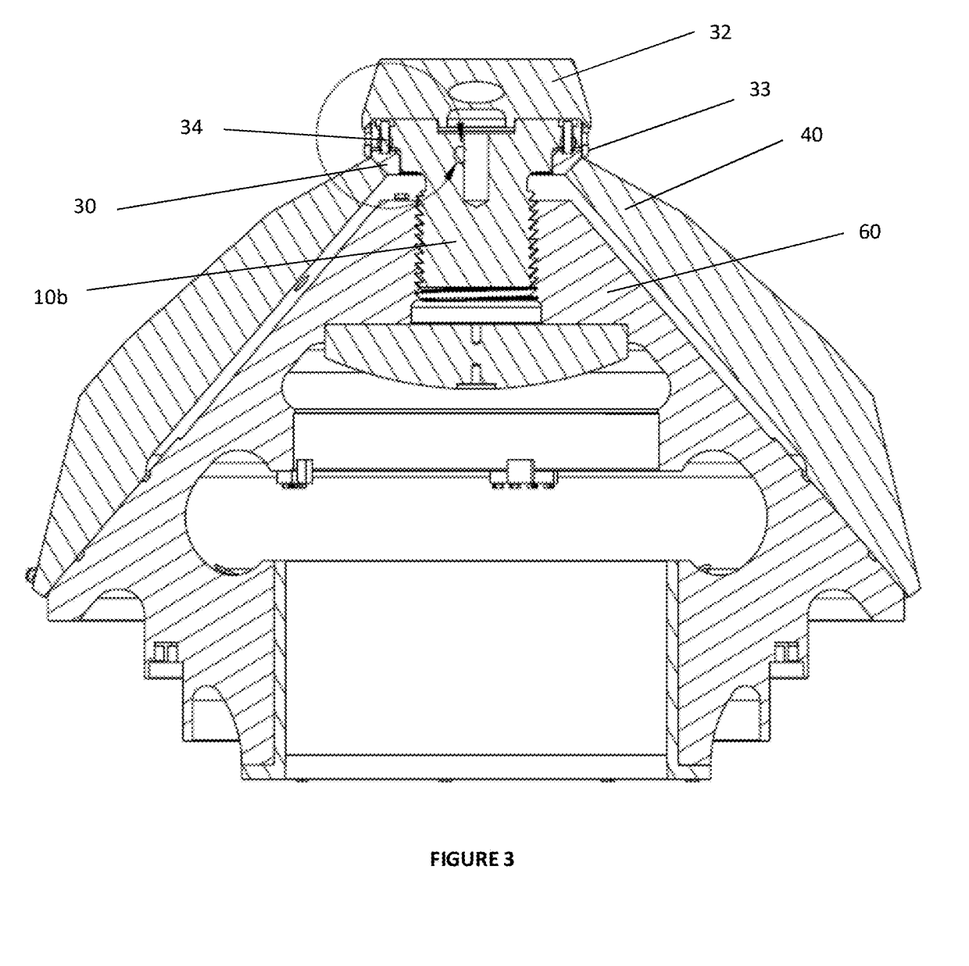
FIG. 3 shows a first cross sectional view of an exemplary embodiment of the locking bolt assembly.
Figure 4:
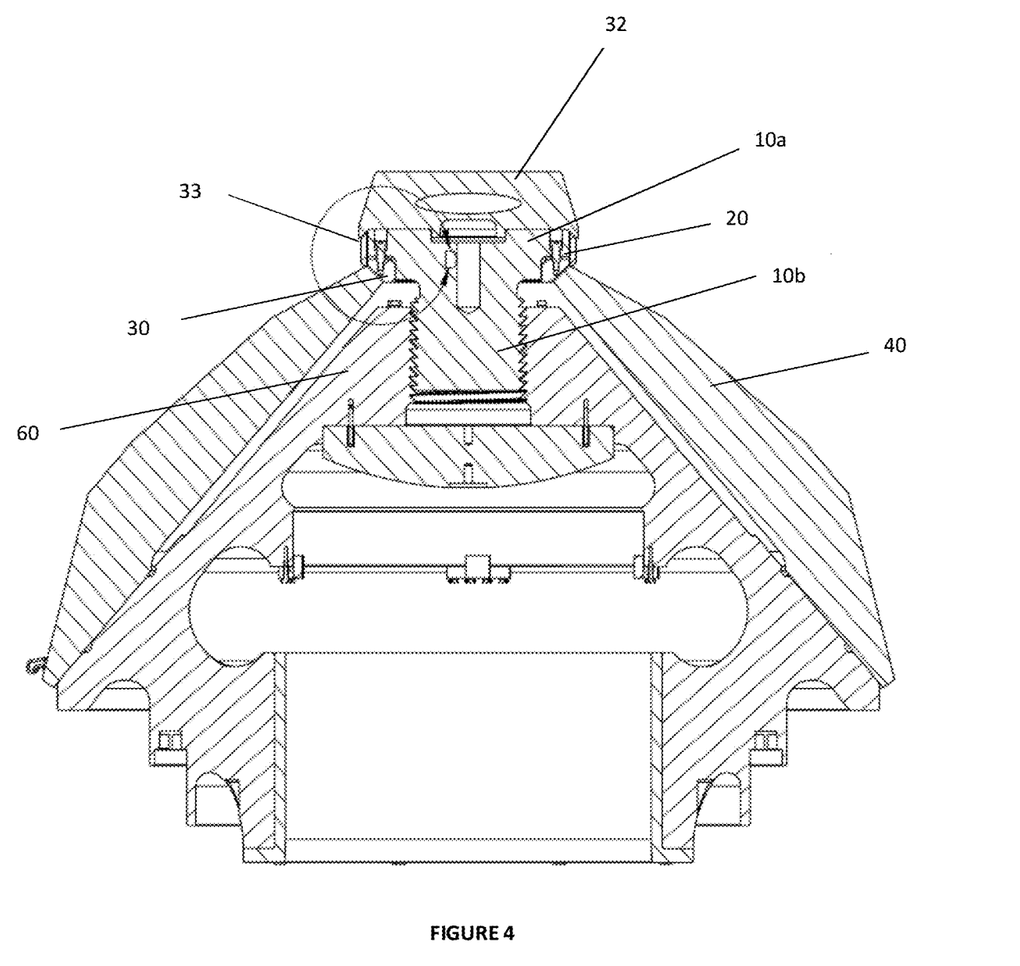
FIG. 4 shows a second cross sectional view of an exemplary embodiment of the locking bolt assembly.

FIGS. 1 and 2 depict exemplary embodiments of a locking bolt assembly 1 for securing a mantle 40 to a head assembly 60 of a crushing device e.g. a cone crusher, as partially shown in FIGS. 3-4. The crushing device can be one of many different types of cone crushers, e.g. the Raptor® or the HP (High Performance) Series. It is also envisaged that the locking bolt assembly 1 could be used for securing a mantle to the head assembly of a gyratory crusher.

During operation of a crushing device, crushing forces are exerted against the mantle 40 of the head assembly 60. Mantels 40 are removable components and as such are required to be replaced when worn. As shown in e.g. FIGS. 3 and 4, the mantle 40 rests upon a sloped outer surface of the head assembly 60. The mantle 40 is held into place, or secured, on the head assembly 60 by the locking bolt assembly 1 of the present disclosure.

FIG. 1 depicts an exemplary embodiment of the locking bolt assembly 1 of the present disclosure. As shown in FIG. 1, the locking bolt assembly 1 generally includes a locking bolt 10, a re-useable thrust plate 30, one or more fasteners 20 and one or more permanent jacking screws 34. The locking bolt 10 can be comprised of a head portion 10a and a thread portion 10b. The head portion 10a and the thread portion 10b can be integrally connected. The head portion 10a may contain axial bores 11 which are designed to accept fasteners 20 or the permanent jacking screws 34 or both. The thread portion 10b can contain external threads which are designed so that the locking bolt 10 can be threaded into a cavity or bore in the head assembly 60 which can contain a series of internal threads for accepting the external threads of the thread portion 10b. As further shown in FIG. 1, the locking bolt assembly 1 includes a re-usable thrust plate 30. The re-useable thrust plate 30 is disposed between the head portion 10a and a top surface portion 42 of the mantle 40. The re-usable thrust plate 30 can be positioned on a top surface portion 42 of the mantle 40. The re-usable thrust plate 30 provides a hard surface for contact with the head portion 10a and the permanent jacking screws 34. The re-useable thrust plate 30 also contains axial bores 31 which are designed to accept the fasteners 20 or the permanent jacking screws 34 or both. In some embodiments the axial bores 31 span the entire depth of the re-useable thrust plate 30. In other embodiments the axial bores 31 are partial axial bores 31 meaning that they do not span the entire depth of the re-useable thrust plate 30. The fasteners 20 can be disposed in and through the axial bores 11 and in and at least partially through the axial bores 31 in order to connect the locking bolt 10 to the re-usable thrust plate 30. In some embodiments, the axial bores 31 contain a series of internal threads for accepting the external threads of the fasteners 20 or permanent jacking screws 34 or both. In some embodiments, the axial bores 11 are not threaded and can be e.g. interference fit with the fasteners 20, permanent jacking screws 34 or both. It should be noted that re-useable thrust plate 30 is easily removable and not destroyed during the removal of a worn mantle 40 and therefore there is no need to replace it. In one embodiment, the fasteners 20 can be bolts, e.g. shoulder bolts. The locking bolt assembly 1 also includes permanent jacking screws 34. The permanent jacking screws 34 can be disposed in and through the axial bores 11 of the head portion 10a. The permanent jacking screws 34 can be torqued using a mechanical tightening device e.g. a torque wrench. The permanent jacking screws 34 are capable of forcing the locking bolt 10 up and the attached re-useable thrust plate 30 down onto the top surface portion 42 of the mantle 40 thereby securing the mantle 40 on the head assembly 60. In some embodiments, the permanent jacking screws 34 are disposed through both the axial bores 11 in the head portion 10a and the axial bores 31 in the re-useable thrust plate 30 such that the permanent jacking screws 34 directly contact the top surface portion 42 of the mantle 40.

In some embodiments, as shown in e.g. FIGS. 2, 5, 7 and 8, nuts 36, e.g. replaceable high hex nuts can be positioned in the axial bores 11. The nuts 36 can be designed to accept the permanent jacking screws 34 such that when the permanent jacking screws 34 are torqued, the locking bolt 10 is forced up and the re-useable thrust plate is forced down onto the top surface portion 42 of the mantle 40 so that the mantle 40 is secured on the head assembly 60. The nuts 36 are advantageous in that they are consumable. For example, if the internal threads of the nut 36 become striped, the nut 36 can be replaced without altering the head portion 10a or bore 11 there through.

FIG. 2 depicts a more detailed exemplary embodiment of the locking bolt assembly 1 shown in FIG. 1. As shown in FIG. 2, in one embodiment, in addition to the features shown in FIG. 1, the locking bolt assembly 1 can generally be further comprised of any combination of the following: a feed plate 32, a protective sleeve 33, a gasket 38. The feed plate 32 is designed to protect the locking bolt 10 from incoming material to be crushed. In some embodiments, the feed plate 32 is attached to the head portion 10a using screws or bolts. The feed plate 32 can be removed and replaced as required. The protective sleeve 33 can be e.g. an AR400 steel sleeve. The protective sleeve 33 is designed to further protect an outer surface of the locking bolt 10 and can be disposed around an outer annular surface of the head portion 10a. The gasket 38 can be e.g. a sponge gasket and can be designed to protect the threads on the permanent jacking bolts 34 and the threads on the nuts 36 from internal material. The gasket 38 can be disposed between the head portion 10a of the locking bolt 10 and the re-useable thrust plate 30. In some embodiments, dowel pins 37 or the like can be used to secure the gasket 38 to the re-useable thrust plate 30 via threading the dowel pins 37 into axial bores 31 in the thrust plate 30 and axial bores in the gasket 38. The dowel pins 37 further prevent rotational movement of the re-useable thrust plate 30 and the locking bolt 10.

Figure 5:
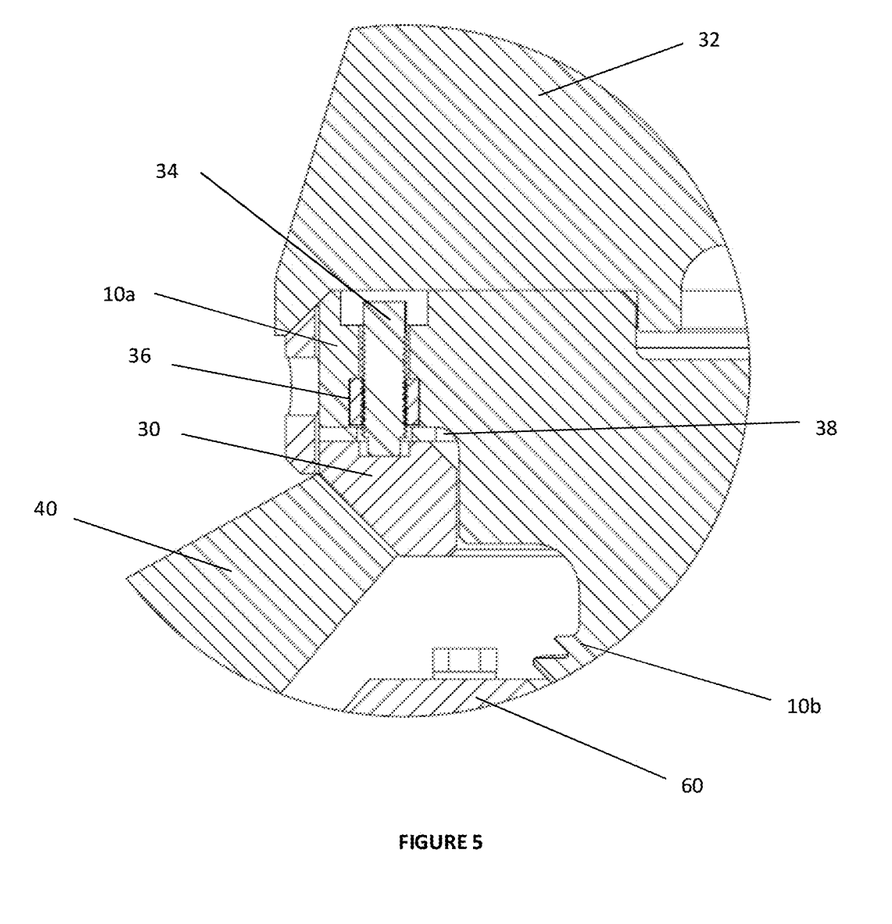
FIG. 5 shows a close-up cross sectional view of a portion of FIG. 3.
Figure 6:
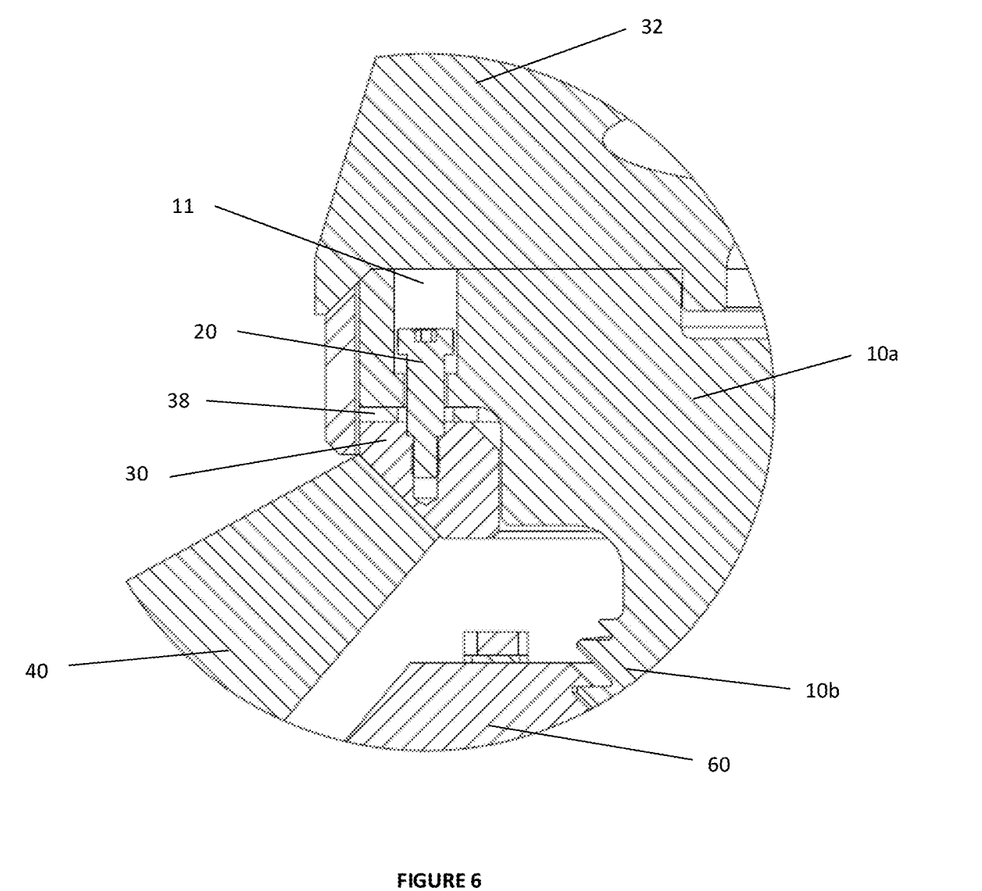
FIG. 6 shows a close-up cross sectional view of a portion of FIG. 4.
Figure 7:
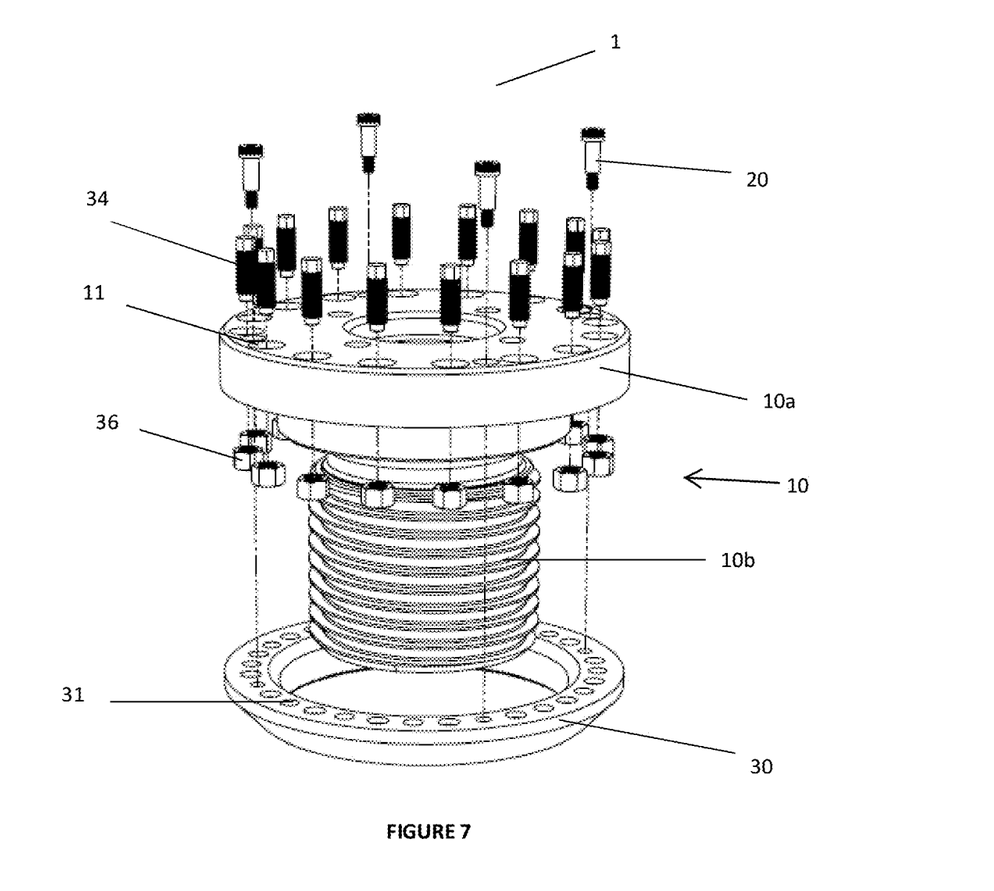
FIG. 7 shows an overview of an exemplary embodiment of the locking bolt assembly including the nuts.
Figure 8:
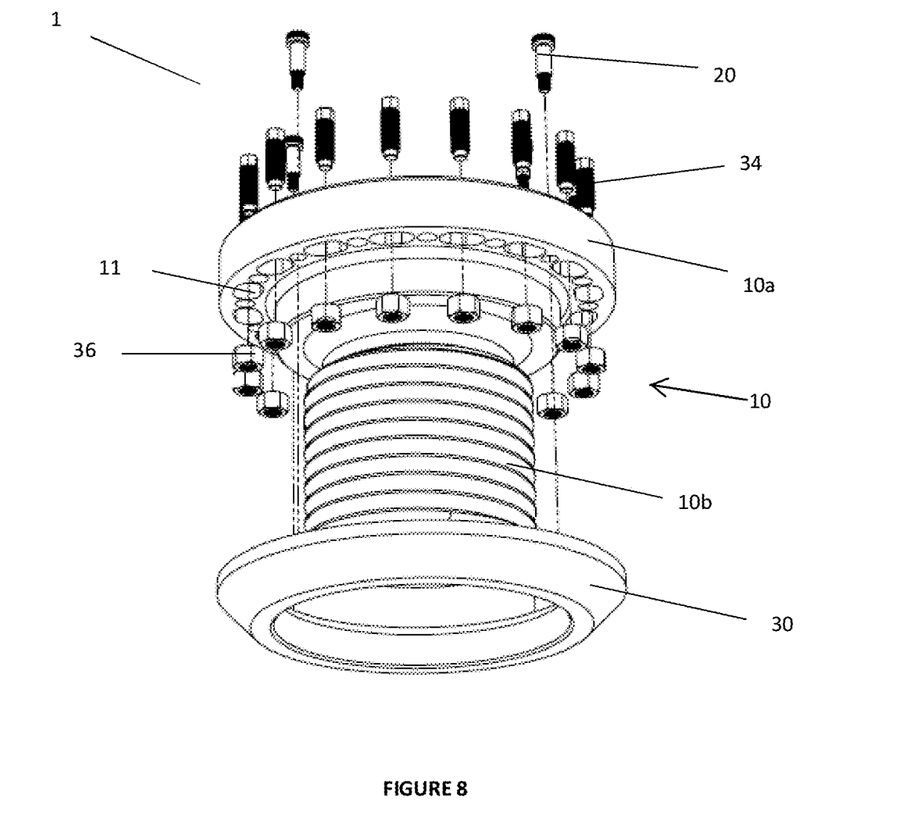
FIG. 8 shows a bottom view of the exemplary embodiments of the locking bolt assembly of FIG. 7.

As detailed in FIGS. 3 and 5, the permanent jacking screws 34 can be received in axial bores 11 in the head portion 10a and be optionally equipped with nuts 36 for creating a jacking force when the permanent jacking screws 34 are torqued. Each of the permanent jacking screws 34 can include a threaded portion and an unthreaded portion. Each of the permanent jacking screws 34 has a top portion and a bottom portion. The top portion may have a series of flat surfaces such that the top portion can receive a wrench socket for rotating the permanent jacking screw 34. The bottom portion typically has a flat surface for engaging the re-useable thrust plate 30 or the top surface portion 42 of the mantle 40 directly. The permanent jacking screws 34 can be made of machined steel such that they possess the required strength for exerting relatively large forces on the mantle 40, either directly or through the re-useable thrust plate 30 without excessive deformation. As shown in FIGS. 1 and 2, in one embodiment of the locking bolt assembly 1, the locking bolt assembly 1 includes sixteen permanent jacking screws 34 spaced around the head portion 10a. It should be understood that a different number of permanent jacking screws 34 could be used or that the permanent jacking screws 34 could be arranged in varying configurations. Although other configurations of the permanent jacking screws 34 are contemplated, it is desirable that the permanent jacking screws 34 be spaced around the entire circumference of the top portion 10a such that the combination of the spaced permanent jacking screws 34 exerts a relatively uniform force when the permanent jacking screws 34 are individually tightened. In some embodiments, the axial bores 11 of the head portion 10a include a series of internal threads that engage the external threads formed on the threaded portion of the permanent jacking screws 34. In other embodiments, e.g. as shown in FIGS. 7 and 8, the axial bores 11 do not have threads and instead have nuts 36 with internal threads which are placed in the axial bores 11 such that the internal threads of the nuts 36 engage the external threads formed on the threaded portion of the permanent jacking screws 34.

The sequence of operation required to utilize the locking bolt assembly 1 is described herein referring to FIGS. 3-6. Before the locking bolt 10 is threaded into the cavity or bore in the head assembly 60, the re-useable thrust plate 30 is attached to the locking bolt 10. The re-useable thrust plate 30 can be attached to the locking bolt 10 by disposing one or more fasteners 20 in and through axial bores 11 in the head portion 10a of the locking bolt 10 and in and at least partially through axial bores 31 in the thrust plate 30. In some embodiments the axial bores 31 in the thrust plate contain internal threads for accepting external threads on the fasteners 20. The thread portion 10b of the locking bolt 10 can then be threaded into the cavity or bore in the head assembly 60 until the thrust plate 30 touches the top portion 42 of the mantle 40. In some embodiments, the locking bolt 10 can be backed off e.g. by ⅛ of a turn or the like. One or more permanent jacking screws 34 can then be disposed in and through the axial bores 11 of the head portion 10a. In some embodiments, there can be threads in the axial bores 11 and in other embodiments (e.g. as shown in FIGS. 2, 7 and 8) there can be threads in nuts 36 which are placed within the axial bores 11. The permanent jacking screws 34 can then be torqued down in e.g. a star pattern using a torque wrench or the like to e.g. 400 ft/lbs which would put approximately 200,000 pounds of force on the threads of the permanent jacking screws 34 which in turn locks the mantle 40 into place on the head assembly 60. To remove the mantle 40, the permanent jacking screws 34 can be gradually untightened with e.g. a torque wrench and the locking bolt 10 will begin to untighten and emerge from the cavity or bore in the head assembly 60 thereby unlocking the mantle 40.

There are numerous advantages of the locking bolt assembly 1 described and claimed herein. Due to the use of a re-useable thrust plate 30 as opposed to a torch ring, the locking bolt assembly 1 can be removed without the use of an oxygen/acetylene torch which decreases maintenance time and reduces safety concerns. Secondly, the re-useable thrust plate 30 is not destroyed during mantle change-outs which can decrease consumable costs. Additionally, the use of permanent jacking screws 34 allows a pre-determined force to be applied to the locking bolt 10 which results in a mechanically sound connection between the locking bolt assembly 1 and the mantle 40 and decreases the chance that the threads of the locking bolt 10 are stripped upon tightening. The locking bolt assembly 1 described and claimed herein also eliminates the need for multiple maintenance personnel for change outs of the mantle 40 and the use of heavy equipment such as pendulum rams and sledge hammers and instead allows for the mantle 40 to be secured and thereafter removed by a single maintenance personnel using e.g. a torque wrench.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

LIST OF COMPONENTS 1 locking bolt assembly
10 locking bolt
10a head portion locking bolt
10b thread portion locking bolt
11, 31 axial bores
20 fasteners
30 re-useable thrust plate
32 feed plate
33 protective sleeve
34 permanent jacking screws
36 nuts
37 dowel pins
38 gasket
40 mantle
42 top surface portion of mantle
60 head assembly

The invention claimed is:
1. A locking bolt assembly (1) for securing a mantle (40) to a head assembly (60) of a crushing device comprising:
  a locking bolt (10) comprising a head portion (10a) and a thread portion (10b), the head portion (10b) having one or more axial bores (11) there through;
  a re-useable thrust plate (30) disposed between the head portion (10a) and a top surface portion (42) of the mantle (40), the re-useable thrust plate (30) having one or more axial bores (31) there through;
  one or more fasteners (20) disposed in and at least partially through the axial bores (11, 31) for connecting the locking bolt (10) to the re-useable thrust plate (30); and
  one or more permanent jacking screws (34) disposed in and at least partially through the axial bores (11) for forcing the locking bolt (10) up and the thrust plate (30)

down onto the top surface portion (42) of the mantle (40) so that the mantle (40) is secured on the head assembly (60).

2. The locking bolt assembly (1) of claim 1, further comprising a gasket (38) disposed between the head portion (10*a*) and the re-useable thrust plate (30).

3. The locking bolt assembly (1) of claim 1, further comprising a protective sleeve (33) for protecting an outer annular surface of the locking bolt (10) wherein the protective sleeve (33) is disposed around an outer annular surface of the head portion (10*a*).

4. The locking bolt assembly (1) of claim 1, further comprising a feed plate (32).

5. The locking bolt assembly (1) of claim 1, further comprising nuts (36) disposed in one or more of the axial bores (11) for accepting the permanent jacking screws (34).

6. A method for securing a mantle (40) to a head assembly (60) of a crushing device comprising:
   providing a locking bolt assembly (1) comprising a locking bolt (10) having a head portion (10*a*) with one or more axial bores (11) there through and a thread portion (10*b*), and a re-useable thrust plate (30) having one or more axial bores (31) there through, the re-useable thrust plate (30) being connected to the head portion (10*a*) via one or more fasteners (20) disposed in and at least partially through the axial bores (11, 31);
   positioning the mantle (40) on the head assembly (60);
   attaching the locking bolt assembly (1) to the head assembly (60);
   inserting a plurality of permanent jacking screws (34) into and at least partially through the axial bores (11) of the head portion (10*a*);
   moving the plurality of permanent jacking screws (34) within the axial bores (11) such that the permanent jacking screws (34) create a locking force between the locking bolt assembly (1) and the head assembly (60) and the locking bolt (10) is pushed up and the re-useable thrust plate (30) is pushed down onto a top surface portion (42) of the mantle (40) such that the mantle (40) is secured on the head assembly (60).

7. The method of claim 6, wherein the thrust plate (30) is positioned on the top surface portion (42) of the mantle (40).

8. The method of claim 6, wherein each of the axial bores (11) includes a series of internal threads that engage external threads on the permanent jacking screws (34), wherein the permanent jacking screws (34) are each rotated to move the permanent jacking screws (34) to create the locking force between the locking bolt assembly (1) and the head assembly (60).

9. The method of claim 6, further comprising the step of inserting nuts (36) into one or more of the axial bores (11), wherein each of the nuts (36) includes a series of internal threads that engage external threads on the permanent jacking screws (34), wherein the permanent jacking screws (34) are each rotated to move the permanent jacking screws (34) to create the locking force between the locking bolt assembly (1) and the head assembly (60).

\* \* \* \* \*